United States Patent
Zehner

(10) Patent No.: US 6,248,813 B1
(45) Date of Patent: *Jun. 19, 2001

(54) VINYL BASED CELLULOSE REINFORCED COMPOSITE

(75) Inventor: Burch E. Zehner, Gahanna, OH (US)

(73) Assignee: Crane Plastics Company Limited Partnership, Columbus, OH (US)

(*) Notice: Subject to any disclaimer, the term of this patent is extended or adjusted under 35 U.S.C. 154(b) by 17 days.

This patent is subject to a terminal disclaimer.

(21) Appl. No.: 09/595,690

(22) Filed: Jun. 16, 2000

Related U.S. Application Data

(63) Continuation of application No. 09/439,677, filed on Nov. 15, 1999, now Pat. No. 6,103,791, which is a continuation of application No. 08/791,178, filed on Jan. 31, 1997, now Pat. No. 6,011,091.

(60) Provisional application No. 60/011,022, filed on Feb. 1, 1996.

(51) Int. Cl.$^7$ ................................................... B27N 3/04

(52) U.S. Cl. ............................................ 524/13; 524/15

(58) Field of Search .................................. 524/13, 15, 16

(56) References Cited

U.S. PATENT DOCUMENTS

| | | | |
|---|---|---|---|
| 2,188,396 | 1/1940 | Semon | 18/55 |
| 2,489,373 | 11/1949 | Gilman | 260/37 |
| 2,519,442 | 8/1950 | Delorme et al. | 260/37 |
| 2,935,763 | 5/1960 | Newman et al. | 18/55 |
| 3,287,480 | 11/1966 | Wechsler et al. | 264/122 |
| 3,562,373 | 2/1971 | Logrippo | 264/118 |
| 3,645,939 | 2/1972 | Gaylord | 260/17.4 GC |
| 3,864,201 | 2/1975 | Susuki et al. | 161/160 |
| 3,867,493 | 2/1975 | Seki | 264/45.9 |
| 3,878,143 | 4/1975 | Baumann et al. | 260/17.4 R |
| 3,879,505 | 4/1975 | Boutillier et al. | 264/48 |
| 3,888,810 | 6/1975 | Shinomura | 260/17.4 BB |
| 3,922,328 | 11/1975 | Johnson | 264/46.1 |
| 3,943,079 | 3/1976 | Hamed | 260/17.4 BB |
| 3,954,555 | 5/1976 | Kole et al. | 162/136 |
| 3,956,541 | 5/1976 | Pringle | 428/2 |
| 4,012,348 | 3/1977 | Chelland et al. | 260/28.5 R |
| 4,016,232 | 4/1977 | Pringle | 264/112 |
| 4,016,233 | 4/1977 | Pringle | 264/122 |
| 4,018,722 | 4/1977 | Baker | 260/2.3 |
| 4,029,831 | 6/1977 | Daunheimer | 427/264 |
| 4,045,603 | 8/1977 | Smith | 428/2 |
| 4,056,591 | 11/1977 | Goettler et al. | 264/108 |
| 4,071,479 | 1/1978 | Broyde et al. | 260/2.3 |
| 4,071,494 | 1/1978 | Gaylord | 260/42.14 |
| 4,097,648 | 6/1978 | Pringle | 428/326 |
| 4,102,106 | 7/1978 | Golder et al. | 52/533 |
| 4,107,110 | 8/1978 | Lachowicz et al. | 260/17.4 CL |
| 4,145,389 | 3/1979 | Smith | 264/40.7 |
| 4,157,415 | 6/1979 | Lindenberg | 428/284 |
| 4,168,251 | 9/1979 | Schinzel et al. | 260/17.4 R |
| 4,178,411 | 12/1979 | Cole et al. | 428/310 |
| 4,181,764 | 1/1980 | Totten | 428/155 |
| 4,187,352 | 2/1980 | Klobbie | 521/79 |
| 4,191,798 | 3/1980 | Schumacher et al. | 428/95 |
| 4,203,876 | 5/1980 | Dereppe et al. | 260/17.4 R |
| 4,228,116 | 10/1980 | Colombo et al. | 264/119 |
| 4,239,679 | 12/1980 | Rolls et al. | 260/42.49 |
| 4,241,133 | 12/1980 | Lund et al. | 428/326 |
| 4,244,903 | 1/1981 | Schnause | 264/68 |
| 4,248,743 | 2/1981 | Goettler | 260/17.4 BB |
| 4,250,222 | 2/1981 | Mavel et al. | 428/285 |
| 4,263,184 | 4/1981 | Leo et al. | 260/17.4 CL |
| 4,263,196 | 4/1981 | Schumacher et al. | 260/33.6 |
| 4,272,577 | 6/1981 | Lyng | 428/112 |
| 4,273,688 | 6/1981 | Porzel et al. | 260/17.4 R |
| 4,303,019 | 12/1981 | Haataja et al. | 108/51.1 |
| 4,305,901 | 12/1981 | Prince et al. | 264/176 R |
| 4,317,765 | 3/1982 | Gaylord | 523/204 |
| 4,323,625 | 4/1982 | Coran et al. | 428/361 |
| 4,376,144 | 3/1983 | Goettler | 428/36 |
| 4,382,758 | 5/1983 | Nopper et al. | 425/82.1 |
| 4,414,267 | 11/1983 | Corane et al. | 428/288 |
| 4,420,351 | 12/1983 | Lussi et al. | 156/62.4 |
| 4,430,468 | 2/1984 | Schumacher | 524/109 |
| 4,480,061 | 10/1984 | Coughlin et al. | 524/13 |

(List continued on next page.)

FOREIGN PATENT DOCUMENTS

| | | |
|---|---|---|
| 2042176 | 4/1971 | (DE) . |
| 44033/73 | 9/1973 | (DE) . |
| 3801574 | 1/1988 | (DE) . |
| 93306843 | 8/1993 | (EP) . |
| 93306844 | 8/1993 | (EP) . |
| 93306845 | 8/1993 | (EP) . |
| 96304100 | 6/1996 | (EP) . |
| 74 06548 | 2/1974 | (FR) . |
| 76 28288 | 9/1976 | (FR) . |
| 79 10288 | 4/1979 | (FR) . |
| 84 07466 | 5/1984 | (FR) . |
| 8223635 | 8/1982 | (GB) . |
| 86 04589 | 2/1986 | (GB) . |
| 87 02959 | 2/1987 | (GB) . |
| PCT/SE90/00014 | 1/1990 | (WO) . |

OTHER PUBLICATIONS

Bendtsen et al., Mechanical Properties of Wood, pp. 4–2 to 4–44.

Bibliography of Sold Phase Extrusion, pp. 187–195.

(List continued on next page.)

Primary Examiner—Mary Lynn Theisen
(74) Attorney, Agent, or Firm—Standley & Gilcrest LLP

(57) ABSTRACT

A cellulosic composite comprising: (a) at least one cellulosic material present in an amount in the range of from about 50% to about 75% by weight of the composite, (b) at least one polyvinyl chloride material present in an amount in the range of from about 25% to about 50% by weight of the composite, and (c) at least one polar thermosetting material present in an amount in the range of from about 0% to about 4% by weight of the composite is disclosed. An extruded article made form the cellulose composite and a method of making the cellulose composite are also disclosed.

10 Claims, No Drawings

U.S. PATENT DOCUMENTS

| | | | |
|---|---|---|---|
| 4,481,701 | 11/1984 | Hewitt | 29/416 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gåsland | 162/158 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,687,793 | 8/1987 | Motegi et al. | 523/200 |
| 4,717,742 | 1/1988 | Beshay | 523/203 |
| 4,737,532 | 4/1988 | Fujita et al. | 524/13 |
| 4,783,493 | 11/1988 | Moetgi et al. | 524/13 |
| 4,789,604 | 12/1988 | van der Hoeven | 428/503 |
| 4,791,020 | 12/1988 | Kokta | 428/326 |
| 4,801,495 | 1/1989 | van der Hoeven | 428/286 |
| 4,818,604 | 4/1989 | Tock | 428/319.9 |
| 4,820,749 | 4/1989 | Beshay | 523/203 |
| 4,851,458 | 7/1989 | Hopperdietzel | 523/205 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,572 | 5/1990 | van der Hoeven | 264/22 |
| 4,927,579 | 5/1990 | Moore | 264/101 |
| 4,935,182 | 6/1990 | Ehner et al. | 264/112 |
| 4,968,463 | 11/1990 | Levasseur | 264/40.1 |
| 5,008,310 | 4/1991 | Beshay | 524/13 |
| 5,009,586 | 4/1991 | Pallmann | 425/311 |
| 5,064,592 | 11/1991 | Ueda et al. . | |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,087,400 | 2/1992 | Theuveny | 264/115 |
| 5,088,910 | 2/1992 | Goforth et al. | 425/142 |
| 5,096,046 | 3/1992 | Goforth et al. | 198/604 |
| 5,096,406 | 3/1992 | Brooks | 425/205 |
| 5,120,776 | 6/1992 | Raj et al. | 524/13 |
| 5,153,241 | 10/1992 | Beshay | 524/8 |
| 5,194,461 | 3/1993 | Bergquist et al. | 524/13 |
| 5,272,000 | 12/1993 | Chenoweth et al. | 428/283 |
| 5,276,082 | 1/1994 | Forry et al. | 524/504 |
| 5,288,772 | 2/1994 | Hon | 524/35 |
| 5,302,634 | 4/1994 | Mushovic | 523/219 |
| 5,369,147 | 11/1994 | Mushovic | 523/219 |
| 5,406,768 | 4/1995 | Giuseppe et al. | 52/730.4 |
| 5,474,722 | 12/1995 | Woodhams | 264/45.3 |
| 5,480,602 | 1/1996 | Nagaich | 264/122 |
| 5,486,553 | 1/1996 | Deaner et al. | 524/13 |
| 5,497,594 | 3/1996 | Giuseppe et al. | 52/730.4 |
| 5,516,472 | 5/1996 | Laver | 264/118 |
| 5,518,677 | 5/1996 | Deaner et al. | 264/142 |
| 5,532,065 | 7/1996 | Gübitz | 428/480 |
| 5,539,027 | 7/1996 | Deaner et al. | 524/13 |
| 5,576,374 | 11/1996 | Besto et al. | 524/451 |
| 5,585,155 | 12/1996 | Heikkila et al. | 428/36.7 |
| 5,593,625 | 1/1997 | Riebel et al. | 264/115 |

OTHER PUBLICATIONS

Brzoskowski et al., Air–Lubricated Die for Extrusion of Rubber Compounds, Rubber Chemistry and Technology, vol. 60, pp. 945–956.

Collier et al., High Strength Extrudates by Melt Transformation Coextrusion, ANTEC, 1987, pp. 497–502.

Collier et al., Streamlined Dies and Profile Extrusion, ANTEC, 1987, pp. 203–206.

Company News, Plastics Industry News, May 1994, pp. 70–71.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B.F. Goodrich, Geon Vinyl Division, section 1, pp. 2–15.

Fill Thermoplastics with Wood, Modern Plastics, May 1974, pp. 54–55.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Construction, vol. 9 No. 5, 1986, pp. 5–6.

Henrici–Olive et al., Integral/Structural Ploymer Foams, Technology, Properties and Applications, Springer–Verlag, pp. 111–122.

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III. Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Québec à Trois–Rivières, Canada.

Kokta et al., Use of Wood Fibers in Thermoplastic Composites, Polymer Composites, Oct. 1983, pp. 229–232.

Maldas et al., Composites of Polyvinyl Chloride–Wood Fibers: IV. Effect of the Nature of Fibers, Journal of Vinyl Technology, Jun. 1989, pp. 90–98.

Maldas, et al.. Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529–539 (1989).

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, 1984, pp. 602–604.

Myers et al., Wood Fiber/Polymer Composites: Fundamental Concepts, Processes, and Material Options, Wood flour and polypropylene or high–density polyethylene composites: influence of maleated polypropylene concentration and extrusion temperature on properties, pp. 49–56.

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Resin Stretching: Accent on Performance, Modern Plastic International, Jan. 1974, pp. 58–60.

Sonwood outline, Apr. 1975.

Sonwood: a new PVC wood–flour alloy for Extrusions and other Plastic Processing Techniques, Sonesson Plast AB, Malmo, Sweden.

Stage, Makromol. Chem., Macromol, Symp., No. 29, pp. 314–320 (1989).

Techno Material, Techno Material Co., Ltd.

Thomas et al., Wood Fibers as Reinforcing Fillers for Polyolefins, ANTEC, 1984, pp. 687–689.

Wood Filled PVC, Plastics Industry News, Jul. 1996, p. 6.

Woodhams et al., Wood Fibers as Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–Jun. 1990, pp. 693–699.

Yuskova, et al., Interaction of Components in Poly(Vinyl Choloride) Filled in Polymetization.

Zadorecki et al., Future Prospects for Wood Cellulose as Reinforcement In Organic Polymer Composites, Polymer Composites, Apr. 1989, pp. 69–77.

VINYL BASED CELLULOSE REINFORCED COMPOSITE

This application is a continuation of U.S. patent application Ser. No. 09/439,677 filed Nov. 15, 1999, now U.S. Pat. No. 6,103,791, which is a continuation of U.S. patent application Ser. No. 08/791,178 filed Jan. 31, 1997, now U.S. Pat. No. 6,011,091, which claimed the benefit of U.S. Provisional Application No. 60/011,022, filed Feb. 1, 1996.

BACKGROUND OF THE INVENTION

The application relates generally to cellulose reinforced composites, and more particularly to vinyl based cellulose reinforced composites.

There is a very high demand for wood products. Although wood is a renewable resource, it takes many years for trees to mature. Consequently, the supply of wood suitable for use in construction is decreasing. Therefore, there is a need to develop alternatives to the use of wood in construction.

Wood replacement materials are known in the art. Wood scraps, such as wood meal, wood chips, and saw dust, have been mixed with different types of materials, including plastics such as low and high density polyethylene, thermosetting resins, and epoxy resins. For example, U.S. Pat. Nos. 4,091,153, 4,686,251, 4,708,623, 5,055,247, 3,908,902, 5,002,713, 5,087,400, and 5,151,238 relate to processes for producing wood replacement products.

Composites made from vinyl based thermoplastics, such as polyvinyl chloride (PVC) chlorinated polyvinyl chloride (CPVC), and semi-rigid polyvinyl chloride (S-RPVC), offer advantages over olefin based composites. The advantages include improved weatherability and good adhesion to the wood material without the need for adhesives or tie layers. However, vinyl based thermoplastics are generally more difficult to process than olefin based thermoplastics.

Therefore, there is a need for a vinyl based cellulose reinforced composite which can be processed easily and without the need for complex die arrangements.

DESCRIPTION OF THE INVENTION

In broadest terms, the present invention includes a cellulosic composite comprising: (a) at least one cellulosic material present in an amount in the range of from about 50% to about 75% by weight of the composite, (b) at least one polyvinyl chloride material present in an amount in the range of from about 25% to about 50% by weight of the composite, and (c) at least one polar thermosetting material present in an amount in the range of from about 0% to about 4% by weight of the composite.

It is preferred that the cellulosic material(s) is/are present in an amount in the range of from about 60% to about 70% by weight of the composite. It is also preferred that the cellulosic material(s) be selected from wood saw dust, seed husks, ground rice hulls, newspaper, kenaf, coconut shells, bagasse, corn cobs, and peanut shells, and mixtures thereof.

It is preferred that the polyvinyl chloride material(s) be present in an amount in the range of from about 30% to about 40% by weight of the composite.

It is preferred that the thermosetting material(s) be present in an amount in the range of from about 0% to about 1% by weight of the composite.

The invention also includes an extruded article produced by extruding a cellulosic composite of the present invention in its many embodiments as described herein and as claimed.

The invention also includes a method of extruding a cellulosic composite in its many embodiments as described herein, the method comprising the steps of: (1) extruding a cellulosic composite as described above and as claimed, and (2) allowing the cellulosic composite to cure for sufficient time at sufficient temperature to form a solid extrudate.

The composite compound consists of rigid PVC dryblend compound, combined with relatively high loadings of cellulose reinforcement.

Optionally, thermosetting materials can be added to improve properties such as moisture absorption and strength. Among the thermosetting materials which can be used are isocyanates, and phenolic and epoxy resins, and mixtures thereof.

| Ingredient | Range (by weight) | Preferred Range (by weight) |
| --- | --- | --- |
| Wood sawdust | 50–75% | 60–70% |
| PVC material | 25–50% | 30–40% |
| Thermosetting material | 0–4% | 0–1% |

PVC has a relatively high melt viscosity coupled with a sensitivity to thermal degradation that can result in catastrophic breakdown of the polymer in the manufacturing step of producing useful articles. It has been found that the extremely high cellulose levels require a specialized PVC material to facilitate extrusion into useful shapes.

The PVC material may include:

| Ingredient | Range (per 100 parts of resin) | Preferred Range (per 100 parts of resin) |
| --- | --- | --- |
| PVC resin (I.V. range of 0.6–1.0) | 100 parts | 100 parts |
| Stabilizer | 2–8 phr | 5–7 phr |
| Lubricants | 4–10 phr | 6–8 phr |
| Process Aids | 2–6 phr | 3–5 phr |

Tin stabilizers are preferred for environmental reasons; however, lead and metal soaps, such as barium, cadmium, and zinc, should work similarly.

Common commercial lubricants known in the plastics processing industry, both internal and external, can be used. Examples of lubricants which can be used include calcium stearate, esters, paraffin wax, and amide wax.

Process aids such as acrylic modifiers for PVC aid fusion of the compound.

Additional components, for example foaming agents and compatibilizers, can be added if desired.

The PVC material can be made by mixing the PVC resin with the stabilizer, lubricants, and process aids in a high intensity mixer, such as those made by Littleford Day Inc. or Henschel Mixers America Inc. The mechanically induced friction heats the ingredients to a temperature between about 200° F. and 230° F. After mixing, the ingredients are cooled to ambient temperature.

The cellulose material should be dried to between about 0.5%–3% in moisture content, preferably 1–2% moisture by weight.

The dried cellulose is combined with the PVC material and the thermosetting material, if any, in a low intensity mixer such as a ribbon blender.

The mixture is preferably processed in a conical twin screw counterrotating extruder with a vent. A force feed hopper (or "crammer") is preferred to feed the materials into the extruder, although other types of hoppers could be used.

The die design is streamlined with a compaction ratio of between about 2:1 to 4:1. An extended die land provides the necessary back pressure to provide a uniform melt, and compaction and shaping of the melt.

A vinyl based cellulose reinforced composite was made as follows. PVC resin was combined with 6 phr stabilizer, 7 phr lubricants, and 4 phr process aids in a high intensity mixer until a temperature of approximately 220° F. was obtained. The PVC material was then cooled to ambient temperature. The wood flour was dried to a moisture content of less than. 2%. The dried wood flour (65%) was mixed with the PVC material (35%) in a ribbon blender for approximately 10 min. No thermosetting materials were added in this example.

The dry blend was then fed into a conical, counterrotating, twin screw extruder (Model CM80 by Cincinnati Milacron). The first two stages of the extruder were heated to about 380° F. The last two stages, which are located after the vent, were heated to about 350° F. The die temperature was also about 350° F. The screw temperature was about 360° F. Vacuum was applied to the vent to further reduce the moisture in the extrudate.

A window profile was extruded without using a breaker plate to reduce stagnant flow areas in the process where PVC compounds have a tendency to thermally degrade. The breaker plate provides back pressure to the extruder to promote the necessary mixing for a homogenous melt delivered to the die. Since the breaker plate was omitted to alleviate degradation, the back pressure necessary to provide a uniform melt, and compaction and shaping of the melt was accomplished within the die by providing a 2:1 compression ratio coupled with an extended die land of approximately 6 inches.

The paint adhesion of the window profile was tested using ASTM D3359 crosshatch tape pulls. The wood composites were abraded using 120 grit sandpaper. A latex primer from Finishes Unlimited was applied to the abraded surface with a brush and allowed to air dry for several days. The visual rating for paint adhesion for a high density polyethylene wood composite was 2B, while for the vinyl based wood composite the rating improved to 3B.

Rectangular test bars measuring ¼ inch by ½ inch and having 65% wood flour and 35% PVC material were made. The test bars were tested using ASTM D790. A modulus of 835,000 psi with a peak stress of 5,050 psi was obtained. This compares favorably to a high density polyethylene composite with 65% by weight wood fibers which had a modulus of 540,000 psi and 1,960 psi peak stress.

Aside from extruding the composition, it has somewhat surprisingly been found that the composition can be compression molded from a powdered dryblend. Flat plaques were made by placing the powdered dryblend in a heated press at a temperature of 350° F. for several minutes. This is unexpected in that compression, unlike extrusion, provides only pressure and heat without distributive shear.

The use of the vinyl base allows known weatherable thermoplastics such as PVC, CPVC, and S-RPVC to be coextruded with good adhesion to the wood composite without the need for adhesives or tie layers. This is not the case for olefinic based composites. In this way, aesthetics as well as outdoor exposure resistance of the cellulose composite is enhanced for such applications as building products.

Resistance to ignition is expected to improve over an olefinic based wood composite due to the halogen content of the vinyl.

The use of a vinyl based wood composite allows improved properties without increased cost as compared to an olefin based wood composite.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A cellulosic composite, said composite comprising:
   (a) at least one cellulosic material present in an amount in the range of from about 50% to about 75% by weight of said composite;
   (b) at least one polyvinyl chloride material present in an amount in the range of from about 25% to about 50% by weight of said composite, said at least one polyvinyl chloride material comprised of at least one stabilizer present in an amount of about 2 to about 8 parts per 100 parts of polyvinyl chloride resin and at least one lubricant present in an amount of about 4 to about 10 parts per 100 parts of polyvinyl chloride resin.

2. A cellulosic composite according to claim 1, wherein said at least one cellulosic material is selected from wood saw dust, seed husks, ground rice hulls, newspaper, kenaf, coconut shells, bagasse, corn cobs, and peanut shells, and mixtures thereof.

3. A cellulosic composite according to claim 1, wherein said at least one polyvinyl chloride material is present in an amount in the range of from about 30% to about 40% by weight of said composite.

4. A cellulosic composite according to claim 1, wherein said at least one cellulosic material is present in an amount in the range of from about 60% to about 70% by weight of said composite.

5. A cellulosic composite according to claim 1, further comprising at least one thermosetting material in an amount in the range of from about 0% to about 4% by weight of said composite.

6. An extruded article, said article produced by extruding a cellulosic composite, said composite comprising:
   (a) at least one cellulosic material present in an amount in the range of from about 50% to about 75% by weight of said composite;
   (b) at least one polyvinyl chloride material present in an amount in the range of from about 25% to about 50% by weight of said composite, said at least one polyvinyl chloride material comprised of at least one stabilizer present in an amount of about 2 to about 8 parts per 100 parts of polyvinyl chloride resin and at least one lubricant present in an amount of about 4 to about 10 parts per 100 parts of polyvinyl chloride resin.

7. An extruded article according to claim 6, wherein said at least one cellulosic material is selected from wood saw dust, seed husks, ground rice hulls, newspaper, kenaf, coconut shells, bagasse, corn cobs, and peanut shells, and mixtures thereof.

8. An extruded article according to claim 6, wherein said at least one polyvinyl chloride material is present in an amount in the range of from about 30% to about 40% by weight of said composite.

9. An extruded article according to claim 6, wherein said at least one cellulosic material is present in an amount in the range of from about 60% to about 70% by weight of said composite.

10. An extruded article according to claim 6, said composite further comprising at least one thermosetting material in an amount in the range of from about 0% to about 4% by weight of said composite.

* * * * *